Aug. 21, 1945. S. GALLO Re. 22,667
METHOD OF MAKING SHOES
Original Filed Feb. 1, 1943
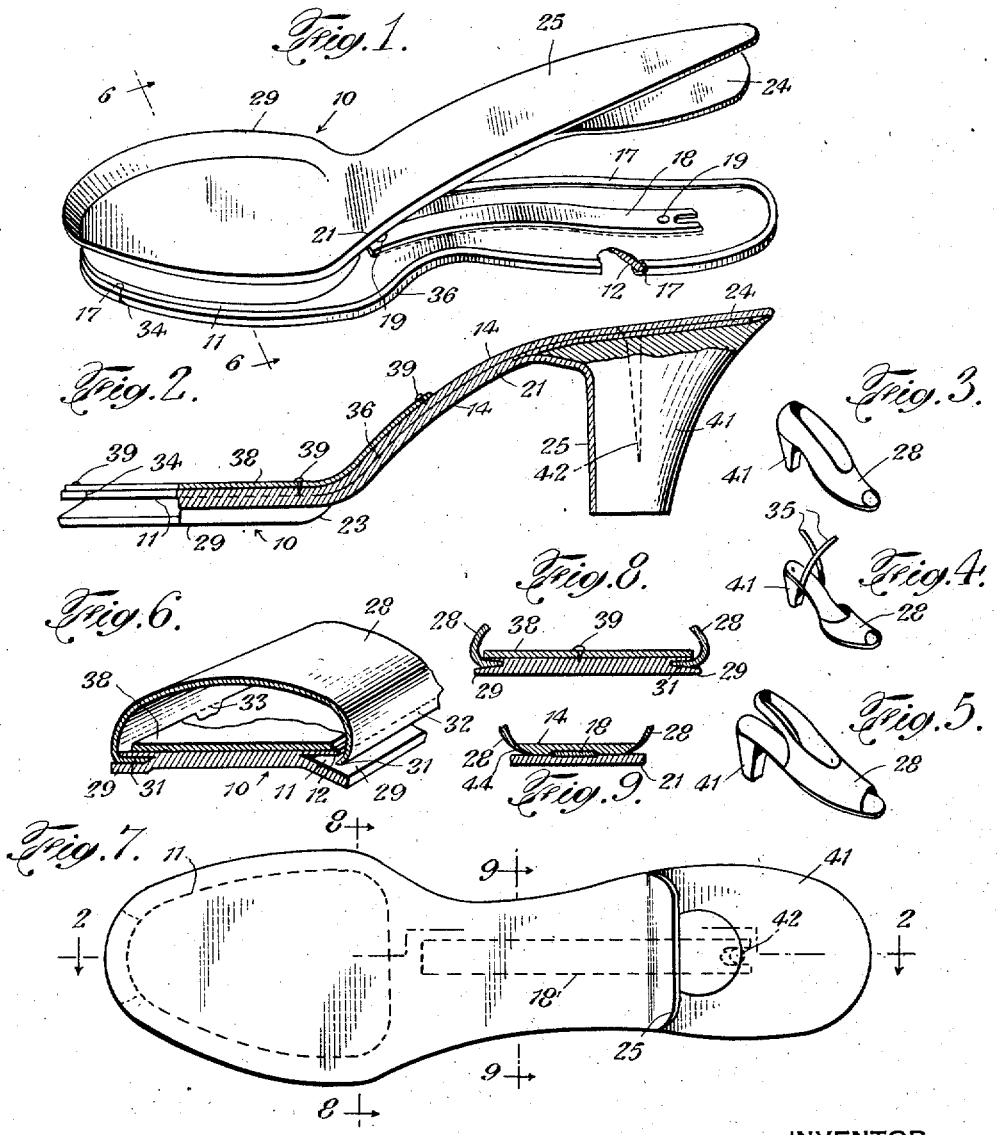
INVENTOR
Sebastiano Gallo
BY
Emery, Varney, Whittemore & Dix.
ATTORNEY Reissued Aug. 21, 1945

Re. 22,667

UNITED STATES PATENT OFFICE 22,667

METHOD OF MAKING SHOES

Sebastiano Gallo, Brooklyn, N. Y.

Original No. 2,353,396, dated July 11, 1944, Serial No. 474,392, February 1, 1943. Application for reissue February 27 1945, Serial No. 580,067

8 Claims. (Cl. 12—142)

This invention relates to the construction of open-toe articles of footwear and more specifically to the attaching of uppers to the soles of open-toe articles of footwear.

The object of the invention is to provide an improved method for making open-toe footwear without using a last for assembling the upper with the sole member to which said upper is attached. The invention includes the use of a plate which is shaped to the desired contour of the portion of the insole or sole member to which the upper is to be connected. The upper is preferably marked to indicate the line along which it must be bent when connecting it with the sole member. The sole is preferably split along its marginal edge for receiving the edge portion of the upper, but the invention can also be used with constructions having an outer sole and a separate insole made by the Del Mac or straight Compo process.

Other objects, features and advantages of the invention will appear or be pointed out as the description proceeds.

In the drawing where like reference characters designate corresponding parts in all the views, Figure 1 is a perspective view illustrating a sole construction to which an upper is to be attached in accordance with this invention.

Figure 2 is a side view, mostly in section, taken along the line 2—2 of Figure 7, showing the sole illustrated in Figure 1, but with a plate for holding the sole to the desired shape, and with the rearward portion of the sole connected with a heel.

Figures 3, 4 and 5 are perspective views, on a reduced scale, showing open-toe shoes made in accordance with this invention.

Figure 6 is a fragmentary perspective view, mostly in section, showing the manner in which an upper is connected with a sole member, the section through the sole member being taken on the line 6—6 of Figure 1, the binding around the edge of the sole member being omitted for greater clearness in the drawing.

Figure 7 is a bottom plan view of the shoe structure shown in Figure 2.

Figures 8 and 9 are sectional views taken on the lines 8—8 and 9—9 of Figure 7 and showing a portion of an upper attached to the sole.

The sole includes a forward or tread portion 10 which is made of wear-resistant material, preferably leather, and a shank portion 14 which is located rearwardly of said tread portion. This sole is substantially non-stretchable. This sole at its forward portion may be made with inner and outer layers connected together, but it is preferably made of one piece split inwardly from its marginal edges. The split is indicated by the reference character 11, and in Figure 1 the sole is shown upside down with the outer flap bent away from the inner portion of the sole. In all of the other views, except Figure 7, the construction is oriented so that the bottom face of the sole is downward. The dotted line indicated by the reference character 11 in Figure 7 shows the depth of the split inward from the marginal edge of the forward portion 10 of the sole.

Referring again to Figure 1, the top portion of the sole, that is, the portion above the split 11, is trimmed back to form an edge 12. Inner portions of this edge 12 which are exposed through the open toe of the upper of the finished shoe, or through other open work of the shoe upper, and the corresponding edge of the rearward or shank portion 14, which is visible in the finished shoe, are covered by edge binding 17 held in place by cement.

The rearward shank portion 14 of the sole comprises an insole portion to which strength is imparted by a metal shank stiffener 18 on the lower surface of the shank portion 14 as shown in Figure 1. The shank stiffener 18 is held in place by the cement and may also be held at its ends by rivets 19.

The rearward portion of the outsole is divided toward its rearward or heel end into a flap 24 and heel breast 25. The flap 24 is preferably thicker than the heel breast 25.

Figure 6 shows the manner in which an upper, such as a vamp 28, is connected with the sole. The split 11 is opened by bending down the outer or bottom flap 29, and the lower marginal edge 31 of the vamp 28 is inserted into the split 11 for the proper distance. The extent to which the marginal edge of the vamp 28 is to be inserted into the split 11 is preferably determined by markings 32 and 33 on the surface of the vamp 28. These markings 32 and 33 indicate the respective lines along which the vamp must be bent inwardly. Each line 32 is on the outside surface of the vamp. Each line 33 is on the inside surface. For some styles of upper, it is easier to use an outside marking 32, for other styles, the inside marking 33 is preferred. The outside and inside markings 32 and 33 are not both essential on the same upper, but it is preferable to have both markings. The inner marking 33 is generally the more convenient to use in determining how far into the split 11 the edge of the shoe upper 28 should be inserted. The outer surface of the upper or vamp 28, which is to be cemented to the flap 29, is roughened before the vamp is attached to the shoe. The outer marking 32 is useful in determining how far back from the edge the vamp should be roughened.

Figures 3, 4 and 5 show different styles of open-toe shoes that can be made in accordance with this invention. Figure 3 shows an open toe pump. In this style of shoe the edge 12 of the inner flap is not visible anywhere except at the toe of the shoe. Figure 4 shows a shoe having an open toe, open shank, and an open back with straps 35. Figure 5 shows an open-toe and open-back shoe.

The sole preferably has marks 34 for indicating the proper location for the forward ends of the upper. In a shoe of the style shown in Figure 4 there is a similar mark 36, see Figures 1 and 2, indicating the proper location of the rearward edge of the vamp 28. These marks 34 and 36 make it possible to put the vamp in place more quickly when connecting it with the sole, and such marks are particularly helpful in cases where the shoes are made by less experienced persons. The shoe shown in Figure 4 also has marks on the sole for indicating the correct location for connecting the straps 35 with the sole. Similarly the shoe shown in Figure 5 preferably has marks on the sole at the correct location for the rearward edge of the upper.

The marginal edge 31 (Figure 6) of the upper 28 is preferably roughened on both the inside and outside and covered with latex cement before being inserted into the split 11. After the marginal edge 31 has been inserted for the proper distance between the flaps of the half-sole 10, the outer flap 29 is bent back parallel with the remainder of the sole 10 as shown on the left hand side of Figure 6. It is necessary to shape and hold the flexible sole to the desired contour of the finished shoe during the time that the upper 28 is being connected with the sole 10, and even more important while connecting the upper with the shank portion 14 of the sole, when the shank portion is arched, as shown in Figure 2.

The sole can be thus shaped by means of a last, but it is a feature of my invention that the upper is assembled with the sole, without using a last. This is made possible by placing a metal plate 38 in abutment with the top of the sole or insole, that is, the inner face of the sole or insole, to shape the sole or insole to final desired shape, while the upper is connected in final relation to the sole or insole, the face of the sole-member to which the plate 38 is applied, is the inner face of said sole-member in the finished article of footwear and the usual sock lining is merely a covering for said inner face. The plate 38 has the same shape as the bottom of the last that would be used for a shoe of the same size. The upper is loose relative to said plate, during the operation of attaching the upper to the sole or insole.

The plate 38 is shown in Figures 2, 6 and 8. This plate is preferably held in place by small tacks 39, which are located at three points along the center of the plate and at locations where they can be easily removed after the upper has been connected with the sole. The tack 39 nearest the toe is removed through the open toe of the finished shoe. The plate 38 is preferably made of iron, though other material of sufficient rigidity is suitable.

The use of the plate 38, instead of a last, makes it possible to assemble the open-toe upper with the sole, in the final relation of the upper and the sole in the finished article of footwear, at lower cost, and with less highly skilled labor, because it is unnecessary to stretch the upper, and the upper and the sole can be directly adhesively connected, thus eliminating the use of tacks. The elimination of the stretching of the upper over the conventional last, produces a better article of footwear.

After the upper has been thus assembled in final relation with the shaped sole, a last can be used in the subsequent operation or operations in completing the shoe. However, the assembled sole and upper fit accurately on said last, so that it is unnecessary to stretch the upper when the assembled sole and upper are located on the last.

After the plate 38 has been detached and removed a heel 41 is connected with the rearward portion 14 of the sole by a screw 42 that passes through the upper end of the shank stiffener 18. The upper surface of the heel 41 is concave, in the usual manner, and the rearward end portion of the shank sole 24 overlies this recessed surface, as shown in Figure 2. The heel breast 25 is cemented to the surface of the heel and trimmed.

When thus assembling an upper with a sole member without a last, this invention is limited to open-toe articles of footwear because a closed toe upper cannot be thus assembled with the sole member. The invention can be used for making open-toe slippers which have heel straps or which have open heels as shown in Figures 4 and 5. When making closed heel footwear, as shown in Figure 3, after assembling the upper and the sole member by the method and process of this invention, the closed heel portion is lasted in the conventional manner.

The preferred embodiment of the invention has been illustrated, but changes and modifications can be made and some features used without others without departing from the invention as defined in the claims.

I claim:

1. In the manufacture of an open-toe article of footwear which has an open-toe upper and a sole-member which is made of pliant material, said sole-member having an arched shank-portion in the finished article of footwear, that method of assembling said open-toe upper and said sole-member without the use of a last, which comprises detachably fastening to the inner face of said sole-member a stiff plate on which the sole-member is shaped to the desired shape of said sole-member in the finished article of footwear, said inner face being the inner face of said sole-member in the finished article of footwear, coating the marginal edge of said sole-member and said upper with cement, allowing time for the cement to become tacky, then joining said upper and said sole-member, on one of which markings are provided for indicating how much of said upper should overlap said sole-member, said joining being accomplished by applying said upper to said sole-member and bending said upper inwardly in accordance with said markings to bring the cement-coated surface of said upper into contact with the cement-coated surface of said sole-member, and after said upper is secured in place, removing the fastenings by which said stiff plate is fixed to said sole-member and withdrawing said plate from said upper and said sole-member, said sole-member and said upper being thus fixed to each other in the final relative position which they have in the finished article of footwear.

2. In the manufacture of an open-toe article of footwear which has an open-toe upper and a sole-member which is made of pliant material, said sole-member having an arched shank-portion in the finished article of footwear, said sole-member being split inwardly from its marginal edge around a portion of its periphery, to form upper and lower flaps along that portion of said periphery which is to be joined to said upper, the method which comprises detachably fixing to the inner face of said sole-member a stiff plate on which the sole-member is shaped to the desired shape of said sole-member in the finished article of footwear, said inner face being the inner face of the said sole-member in the finished article of footwear, said plate being thus fixed to said sole-member at a center point near the toe portion of said sole-member and at another point nearer the midportion of said sole-member, coating the confronting faces of said upper and lower flaps with cement, coating the marginal edges of the upper with cement, and with said lower flap turned down and after the cement has become tacky, inserting said marginal edges of the upper between said flaps, pressing the lower flap upwardly against said coated marginal edge to fix said coated marginal edge between said flaps, and thereafter detaching said stiff plates from said sole-member, said sole-member and said upper being thus fixed to each other in the final relative position which they have in the finished article of footwear.

3. In the manufacture of an open-toe article of footwear which has an open-toe upper and a sole-member which is made of pliant material, said sole-member having a tread portion and also having an arched shank-portion in the finished article of footwear, that method of assembling said open-toe upper and said sole-member without the use of a last, which comprises detachably fastening to the inner face of said sole-member a stiff plate on which the sole-member is shaped to the desired shape of said sole-member in the finished article of footwear, said inner face being the inner face of the sole-member of the finished article of footwear, adhesively fixing the inwardly bent marginal portion of the upper to said sole-member in the final relative assembled position which said upper and said sole-member have in the finished article of footwear and then separating said plate from said assembled upper and sole-member.

4. A method according to claim 3 in which said upper is thus assembled with and fixed to said tread portion and also to at least a part of said shank portion.

5. A method according to claim 3 in which said upper is a one-piece upper which is thus assembled with and fixed to said tread portion and also to at least a part of said shank portion.

6. The method of lasting open-toe footwear without a last, which method comprises detachably fastening to the upper surface of a sole a stiff plate that overlies for a considerable extent the shank portion of the sole and holds said shank portion to the desired arched shape of the completed shoe, adhesively fixing an upper to the marginal edges of the sole, including the marginal edges of the sole along at least a part of the arched shank portion of the sole, by applying the upper to the sole and bending the upper inward to bring a surface of the upper into contact with a surface of the sole with cement between the confronting surfaces of the sole and upper, and after the upper is secured in place removing the fastenings by which the stiff plate is secured to the sole, and withdrawing the plate from within the shoe.

7. The method of securing an upper of open-toe footwear to a sole without a last, which method comprises detachably fastening to the upper surface of the sole a stiff plate that overlies for a considerable extent the shank portion of the sole and holds said shank portion to the desired arched shape of the completed shoe, coating the marginal edges of the sole and an upper with cement including the marginal edges of the sole along at least a part of the arched shank portion of the sole, and with the cement in a tacky condition joining the upper and sole, on one of which markings are provided for indicating how much of the upper should overlap the sole, said joining being accomplished by applying the upper to the sole and bending the upper inward in accordance with said markings to bring the cemented surface of the upper into contact with the cemented surface of the sole, and after the upper is secured in place removing the fastenings by which the stiff plate is secured to the sole, and withdrawing the plate from within the shoe.

8. The method of lasting open-toe footwear without a last which method comprises providing a sole which is split inward from its marginal edge around a portion of its circumference to form upper and lower flaps along the part of the edge that is to be joined with an upper including at least a part of the shank portion of the sole, detachably securing to the upper surface of the sole a rigid plate that overlies for a considerable extent the shank portion of the sole and holds said shank portion to the desired arched shape of the finished shoe, the rigid plate being secured to the sole by fastening the plate to the sole at a central point near the toe of the shoe and at another point nearer the mid-portion of the sole, coating the confronting faces of the upper and lower flaps of the sole with cement, and with the lower flap turned down and the cement in a tacky condition inserting the marginal edges of the upper between the flaps, pressing the lower flap upward against the edges of the upper, and thereafter detaching the rigid plate from the sole.

SEBASTIANO GALLO.